No. 865,678. PATENTED SEPT. 10, 1907.
W. L. BUTLER.
THRESHING MACHINE.
APPLICATION FILED JAN. 24, 1907.
2 SHEETS—SHEET 2.
*Fig. II.*
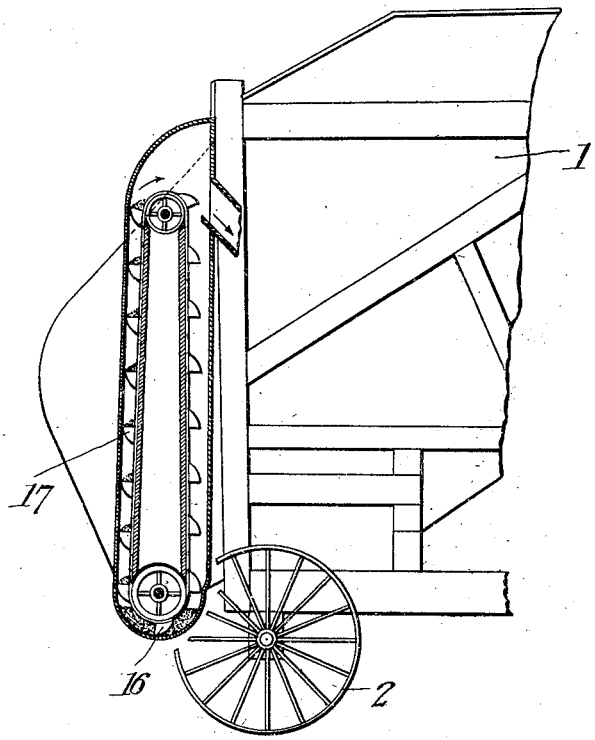
*Fig. III.*
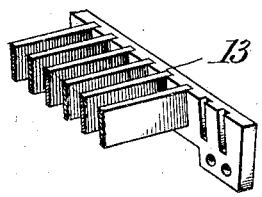
Witnesses:
Inventor:
William L. Butler
By ____ Atty.

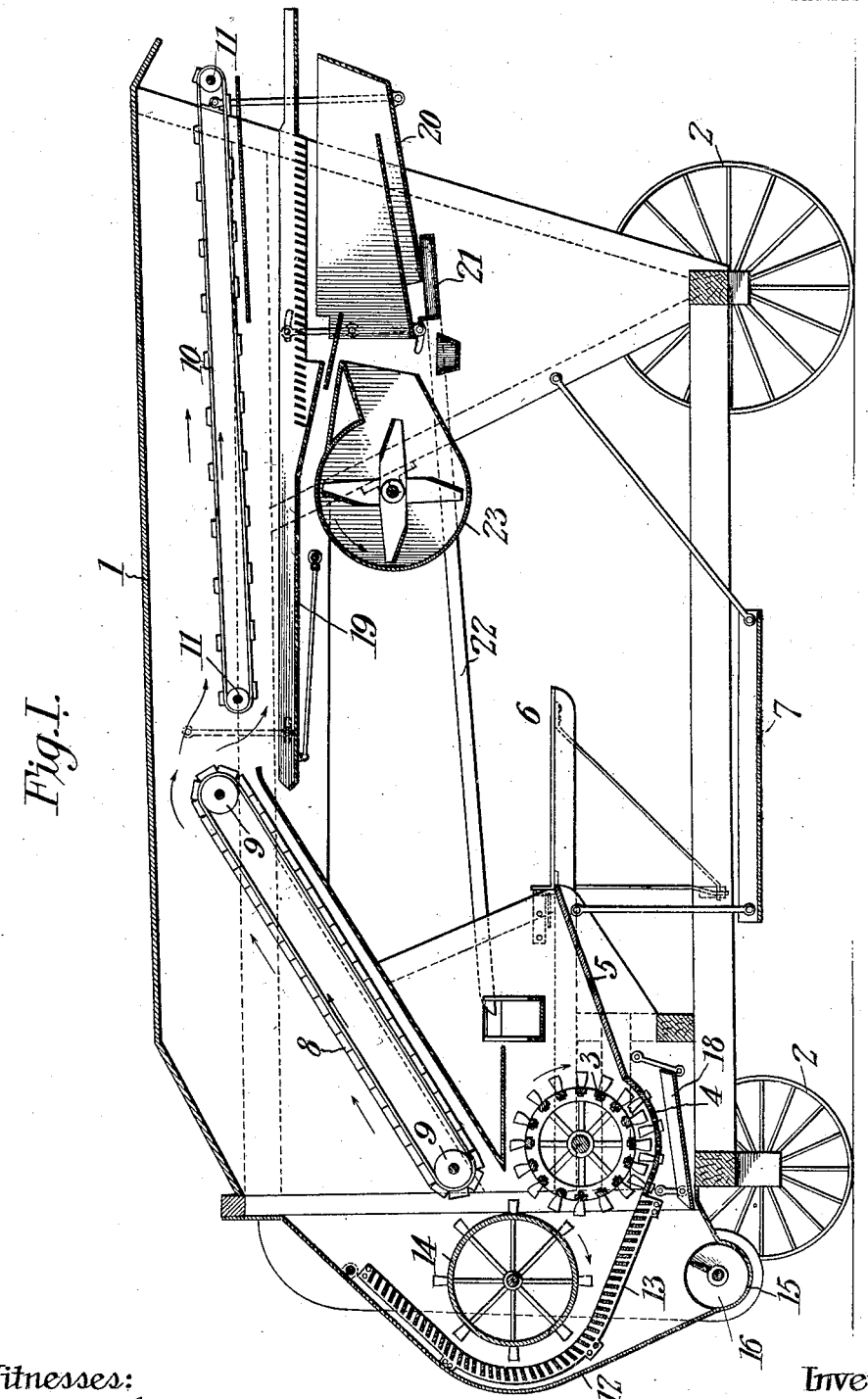

UNITED STATES PATENT OFFICE.

WILLIAM L. BUTLER, OF CARTHAGE, MISSOURI.

THRESHING-MACHINE.

No. 865,678.　　　Specification of Letters Patent.　　　Patented Sept. 10, 1907.

Application filed January 24, 1907. Serial No. 353,813.

*To all whom it may concern:*

Be it known that I, WILLIAM L. BUTLER, a citizen of the United States of America, residing in the city of Carthage, in the county of Jasper and State of Missouri, have invented certain new and useful Improvements in Threshing-Machines, of which the following is a full, clear, and exact description, reference being had to the accompanying drawing, forming part of this specification.

My invention relates to an improvement in threshing machines, and it has, for its main object to provide a construction whereby the grain is effectually separated from the straw immediately after it has been threshed therefrom in its passage between the usual cylinder and concave as a result of inverting the straw and throwing it rearwardly above the cylinder onto a suitable carrier.

Figure I is a longitudinal section taken through my machine. Fig. II is a view partly in side elevation and partly in a vertical section of the forward end of the machine. Fig. III is a perspective view of a fragment of the grate located in the separating chamber of the machine.

1 designates the body of my machine which is supported by ground wheels 2 as usual.

3 is a threshing cylinder that surmounts the usual concave 4.

5 is an incline leading to the concave and extending rearwardly within the threshing chamber of the machine.

6 is a feed table that is located within the machine, adjacent to the incline 5, and from which the person employed in feeding the straw to the threshing cylinder passes such straw onto the incline 5 while standing upon a platform 7, that is suspended from the body of the machine.

8 designates a primary carrier that operates upon rollers 9. This primary carrier extends rearwardly in an upwardly inclined direction from a point above the threshing cylinder 3 to carry the straw rearwardly as it is thrown thereon in a manner to be hereinafter explained.

10 is a secondary straw carrier that operates upon rollers 11. This secondary carrier extends rearwardly from the upper and rear end of the primary carrier and receives the straw discharged from said primary carrier.

12 designates a separating chamber that is located at the forward end of the machine and in front of the threshing chamber in which the threshing cylinder 3 operates.

13 is a grate of concavo-convex contour that is located in an approximately vertical position in the separating chamber. The rear end of this grate is disposed contiguous to the forward end of the concave 4, and the grate extends from such point in an upward and forward direction and then still upwardly and rearwardly within the separating chamber 12.

14 is a rotary straw elevating cylinder or drum that is located in the separating chamber in front of the threshing cylinder 3 and the lower forward end of the primary carrier 8 and between said members and the grate 13. This elevating cylinder or drum also serves as a beater.

As the grain is threshed from the straw through the medium of the threshing cylinder and concave, it is thrown by the threshing cylinder onto the grate 13 and in a direction toward the elevating cylinder or drum 14, which travels in the direction indicated by the arrow Fig. I. The elevating cylinder or drum then acts to pick up the straw and throw it forwardly, upwardly and rearwardly, with the result of changing it from an approximately horizontal position extending in one direction to an approximately horizontal position extending in the other direction, or end for end and thoroughly agitating and inverting the straw and as a consequence, all of the loose grain in the straw is thoroughly shaken therefrom. This dislodged grain falls downwardly in the separating chamber and through the grate 13 while the straw is thrown onto the primary carrier 8 and conducted to the secondary carrier 10 to be discharged from the machine. At the bottom of the separating chamber 12, is a trough 15 that receives the grain as it falls through the grate 13.

16 is a conveyer that operates in the trough 15 and by which the grain is conducted from said trough to elevators 17, located at the sides of the machine. The conveyer 16 is preferably in the form of a right and left screw whereby the grain is discharged to opposite sides of the machine.

18 designates a pan that is located beneath the concave 4 and onto which the grain that passes through said concave falls, to be delivered into the trough 15.

19 designates a shaker located beneath the secondary carrier 10 to receive the small amount of grain that passes to said secondary carrier and also the chaff and cheat that falls from the straw conducted by said secondary carrier.

20 is a shoe, vibratorily suspended immediately beneath the shaker 19 and therefore at a considerably greater elevation than the point at which such shoes are commonly suspended in threshing machines. The object in placing this shoe in the elevated position recited, is to provide for the grain that is discharged from the shoe into a chute 21 being conducted by gravity through a trough 22 that leads to a point adjacent to the threshing cylinder of the machine in order that such grain may be discharged into the threshing chamber and delivered therefrom to the separating chamber, without the use of a mechanical conveyer.

23 is a blower located adjacent to the shoe 20, and having the function usual in the employment of blowers of blowing the light materials from said shoe.

I claim:

1. In a threshing machine, the combination of a threshing cylinder, a carrier having its receiving end located in proximity to said threshing cylinder, and means for inverting the straw passed beneath and threshed by said threshing cylinder before it is delivered onto the receiving end of said carrier, substantially as set forth.

2. In a threshing machine, the combination of a threshing cylinder, a carrier having its receiving end located above and in proximity to said cylinder, and means for inverting the straw passed beneath and threshed by said threshing cylinder and delivering it onto the receiving end of said carrier, substantially as set forth.

3. In a threshing machine, the combination of a threshing cylinder, a carrier having its receiving end located in proximity to said threshing cylinder, and means for positively engaging the straw passed beneath and threshed by said threshing cylinder and inverting and delivering it onto the receiving end of said carrier, substantially as set forth.

4. In a threshing machine, the combination of a threshing cylinder, a carrier having its receiving end located above said threshing cylinder, and means for positively engaging the straw passed beneath and threshed by said threshing cylinder and inverting and delivering it onto the receiving end of said carrier, substantially as set forth.

5. In a threshing machine, the combination of a threshing cylinder, a separating chamber adjacent to said threshing cylinder, a curved grate in said separating chamber, a carrier having its receiving end located in proximity to said threshing cylinder and means working in connection with the grate for inverting the straw passing beneath and threshed by said threshing cylinder, and delivering onto the receiving end of said carrier, substantially as set forth.

6. In a threshing machine, the combination of a threshing cylinder, a carrier having its receiving end located in proximity to said threshing cylinder, and an elevating cylinder or drum located adjacent to said threshing cylinder and by which the straw is delivered to said carrier, substantially as set forth.

7. In a threshing machine, the combination of a threshing cylinder, a carrier having its receiving end located in proximity to said threshing cylinder, a separating chamber adjacent to said threshing cylinder, a grate in said separating chamber and an elevating cylinder or drum, adjacent to said threshing cylinder for elevating the straw and delivering it to said carrier, substantially as set forth.

WILLIAM L. BUTLER.

In the presence of—
F. O. MILNES,
L. M. MATHEWS.